Figure 1:
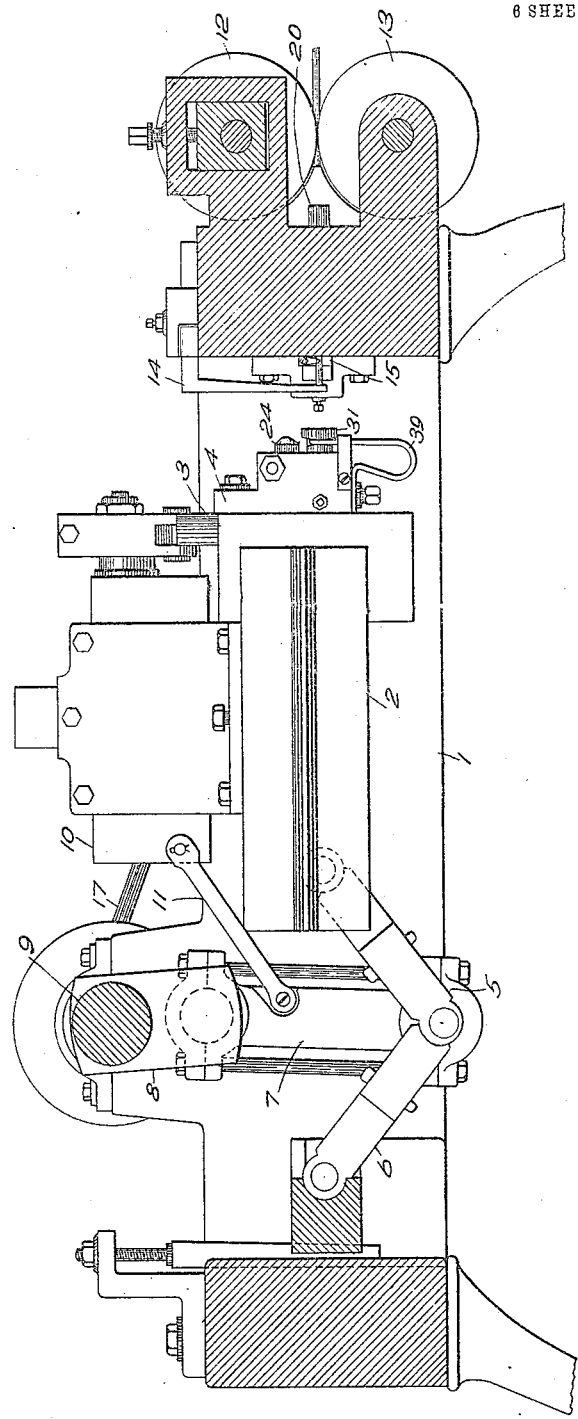

H. H. EATON & G. GODDU.
MACHINE FOR MAKING LACING HOOKS.
APPLICATION FILED JULY 31, 1903.

932,005.

Patented Aug. 24, 1909.

6 SHEETS—SHEET 1.

WITNESSES
Edwin F. Samuels
Farnum F. Dorsey

INVENTORS
Harrison H. Eaton
George Goddu
by their Attorneys
Phillips Van Everen & Fish

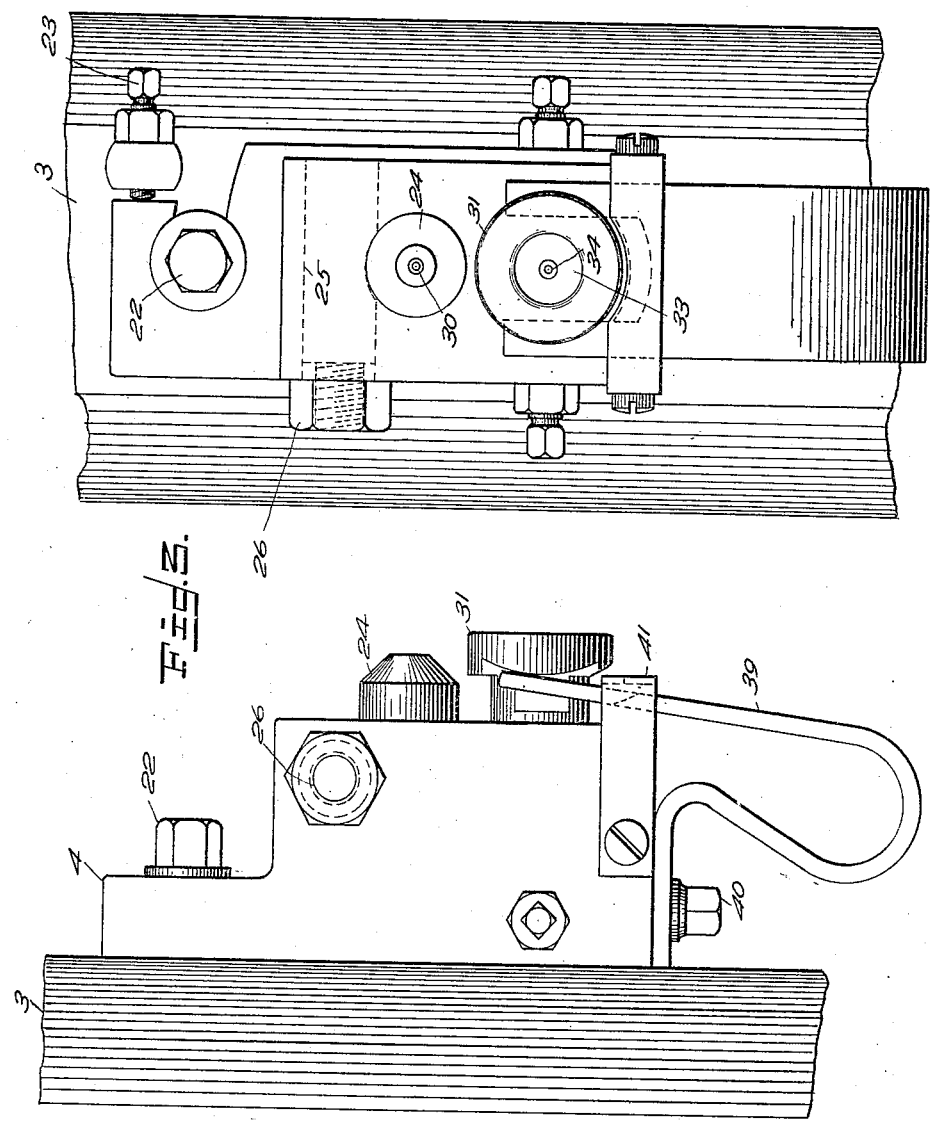

H. H. EATON & G. GODDU.
MACHINE FOR MAKING LACING HOOKS.
APPLICATION FILED JULY 31, 1903.
932,005.
Patented Aug. 24, 1909.
6 SHEETS—SHEET 3.
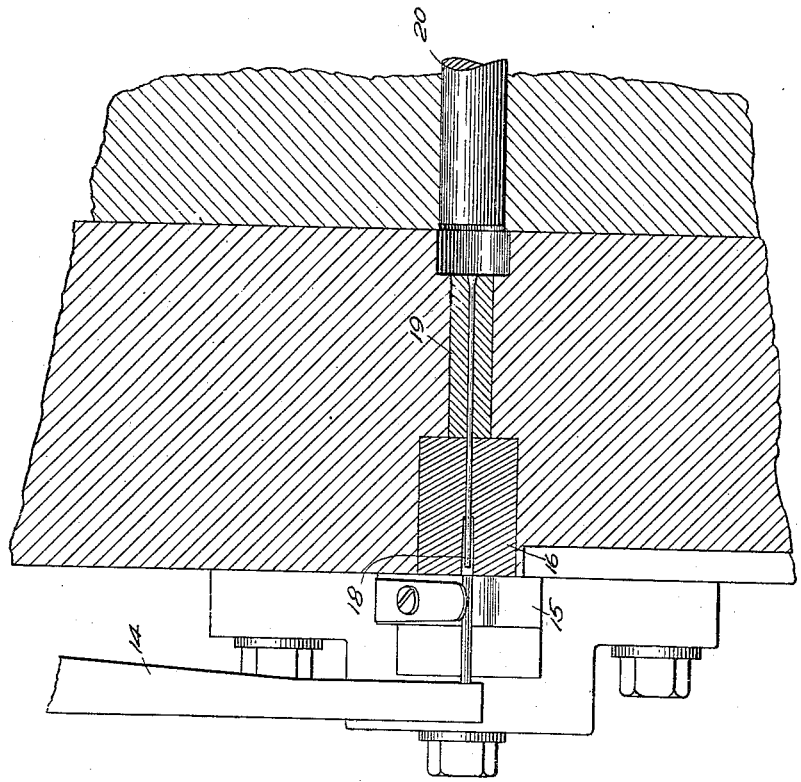
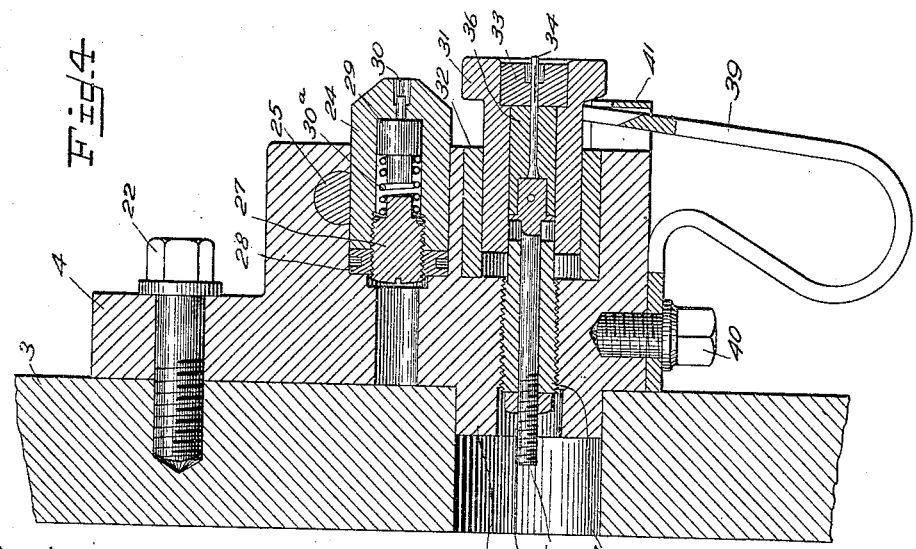

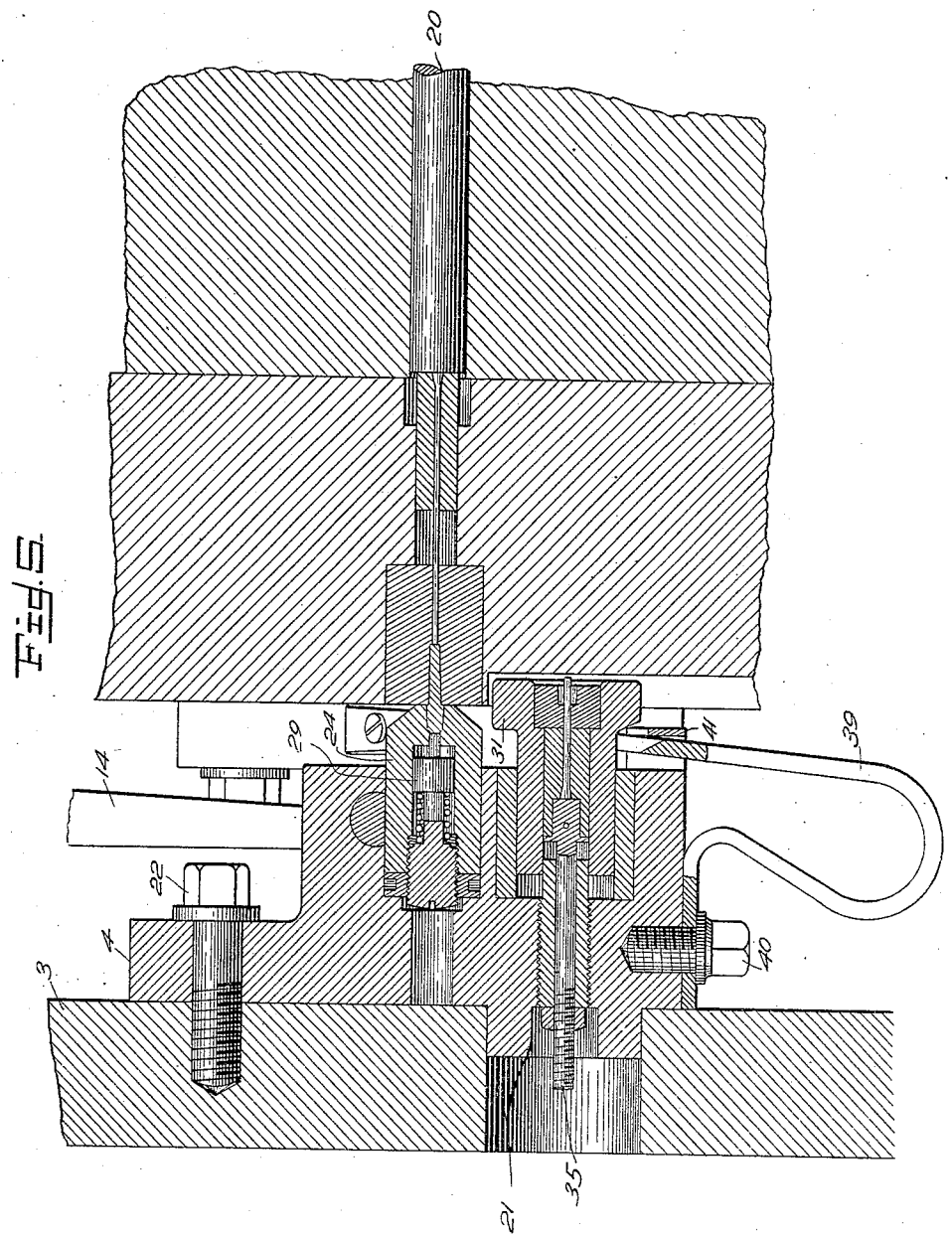

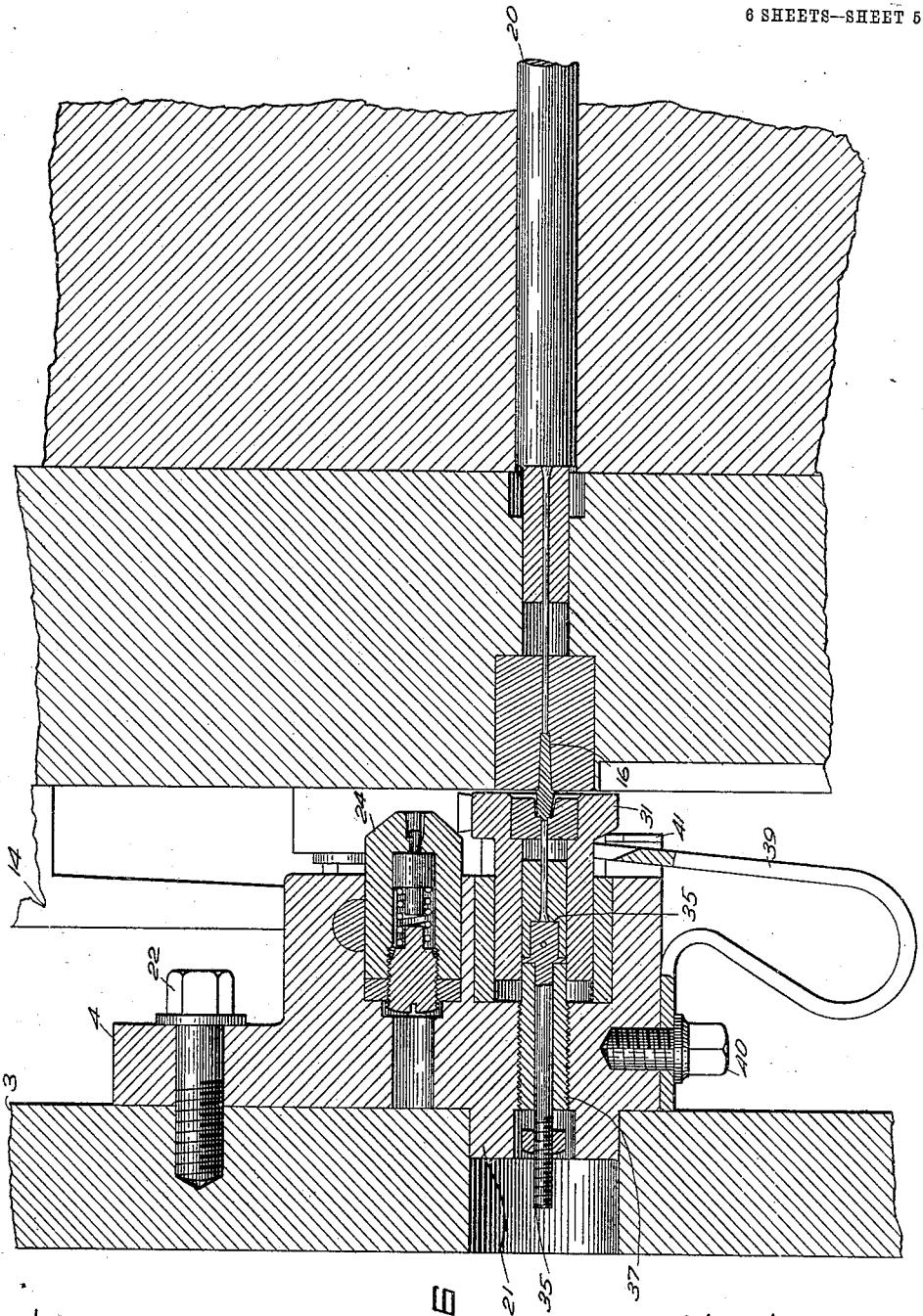

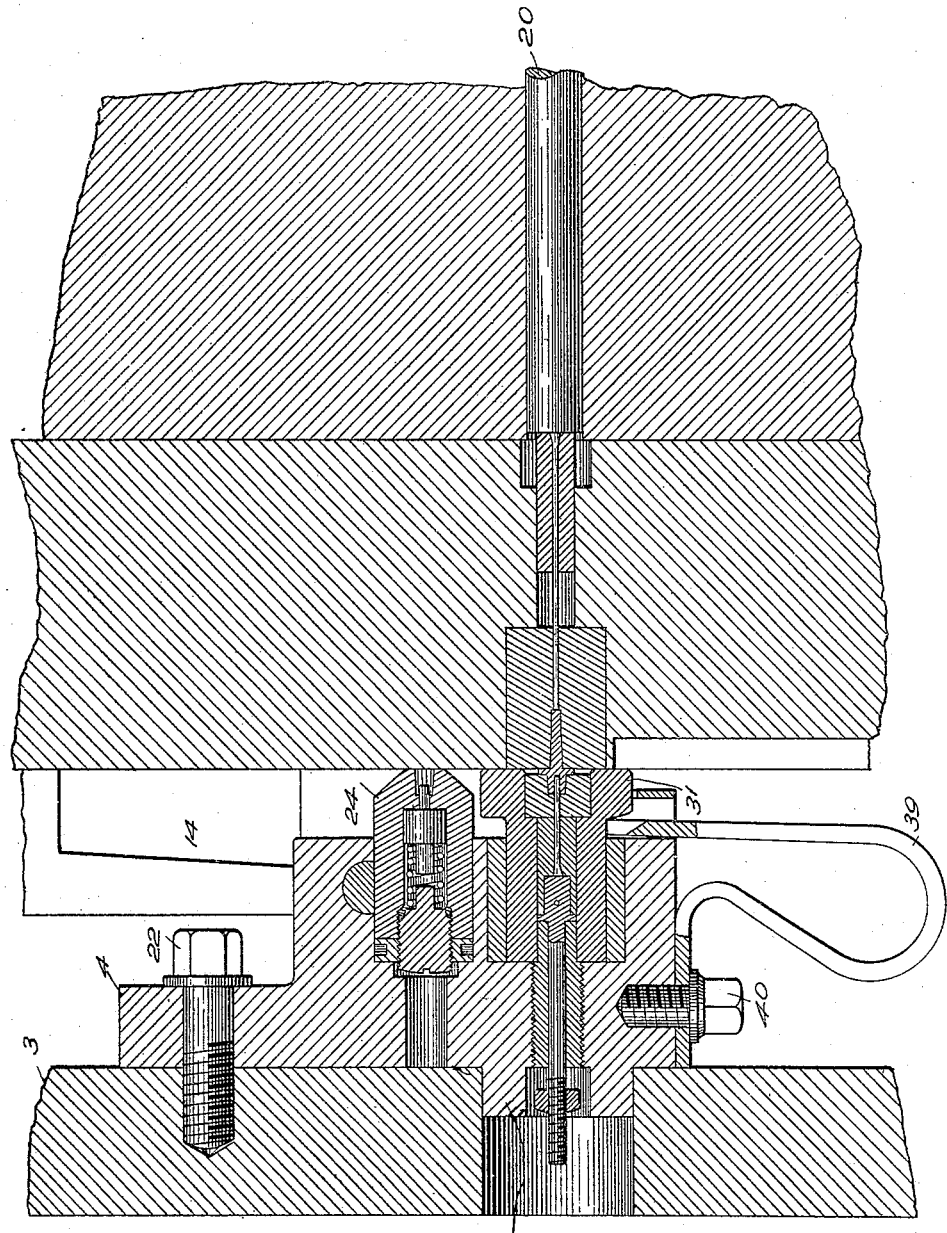

UNITED STATES PATENT OFFICE.

HARRISON H. EATON AND GEORGE GODDU, OF WINCHESTER, MASSACHUSETTS, ASSIGNORS TO UNITED SHOE MACHINERY COMPANY, OF PATERSON, NEW JERSEY, A CORPORATION OF NEW JERSEY.

MACHINE FOR MAKING LACING-HOOKS.

932,005.  Specification of Letters Patent.  Patented Aug. 24, 1909.

Application filed July 31, 1903. Serial No. 167,673.

*To all whom it may concern:*

Be it known that we, HARRISON H. EATON and GEORGE GODDU, citizens of the United States, residing at Winchester, in the county of Essex and State of Massachusetts, have invented certain new and useful Improvements in Machines for Making Lacing-Hooks; and we do hereby declare the following to be a full, clear, and exact description of the invention, such as will enable others skilled in the art to which it appertains to make and use the same.

The present invention relates to machines for making lacing hooks and more particularly to machines for making lacing hooks which comprise a tubular shank and a collar at the upper end of the shank which forms the base of the hook proper and which rests upon the material to which the hook is secured by upsetting the lower end of the tubular shank.

The object of the present invention is to provide a machine for forming the collar and tubular shank of the hook, the embodiment of the invention hereinafter specifically described being designed to produce the article shown in Figure 3 of the patent to Harrison H. Eaton for an improved lacing hook for shoes, No. 11,874 reissued November 27, 1900, the hook being completed by a subsequent operation.

To this end the invention contemplates the provision of a suitable die for holding a blank, such, for instance, as is illustrated in Fig. 1 of the patent above referred to and a die provided with a plunger coöperating therewith to upset the end of the blank to form the collar and tubular shank. Preferably the dies and plunger are so mounted as to have a relative movement while the blank is held between the dies, whereby the plunger is caused to act upon the blank to form the tubular shank while the blank is held by the dies. We have found by causing the plunger to act upon the blank while it is held between the dies that the tubular shank is formed without any liability of breaking the plunger during such operation. We therefore consider a construction having this mode of operation of value and as constituting a feature of our invention whether the dies are used to upset the end of the blank to form the collar and tubular shank or merely to form the tubular shank, although we prefer to utilize the dies to upset the end of the blank to form both the tubular shank and the collar, as thereby the number of separate operations which must be performed upon the blank is diminished and the hooks are more quickly and cheaply produced. Also, preferably the plunger is so mounted with relation to the dies that the dies are allowed to separate sufficiently to relieve the pressure exerted by the dies on the blank before the plunger is withdrawn as thereby the pressure of the metal upon the plunger is relieved and the plunger can be easily withdrawn without liability of breaking the same.

In connection with the blank holding die and the die provided with a plunger coöperating therewith to form the collar and tubular shank of the hook, we preferably employ a die arranged to coöperate with the blank holding die to upset the end of the blank and partially form the shank or the shank and collar prior to the operation thereon of the die for completing the formation of the collar and tubular shank. By providing such a die for partially forming the shank or the shank and collar, the die which completes the formation of the collar and shank is subjected to less strain and also better results are produced than is possible when a single pair of dies is used.

The blank holding die may be constructed to hold separate blanks such, for instance, as illustrated in Fig. 1 of the patent above referred to, or it may be constructed to hold a blank before it is severed from a rod or wire, either form of die being within the purview of our invention.

In addition to the features of invention above referred to, our invention also consists in the devices, combinations, and arrangements of parts hereinafter described and claimed, the advantages of which will be obvious to those skilled in the art.

A preferred form of our invention is illustrated in the accompanying drawings in which—

Fig. 1 is a longitudinal sectional view of a machine embodying the same, said machine with the exception of the dies for operating upon the blanks being of old and well-known construction and only so much of said machine being illustrated as is necessary to show the connection of our invention therewith; Fig. 2 is a view in side elevation of the upsetting dies, the block in which they are mounted and the vertical slide to which the block is secured; Fig. 3 is a view in front elevation of the parts illustrated in Fig. 2; Fig. 4 is a detail sectional view taken on a vertical plane passing through the blank holding and upsetting dies; and Figs. 5, 6, and 7 are detail sectional views similar to Fig. 4, illustrating the operation of the machine in upsetting the end of a blank to form the collar and tubular shank.

The machine with which, for convenience of illustration, we have shown our invention connected, is of old and well-known construction and is known in the art as a double-blow rivet machine. This machine is provided with feeding rolls for feeding a continuous wire into the machine and with means for cutting a blank from the wire and for transferring the cut-off blank to a stationary holding die. The machine is also provided with two upsetting dies arranged one above the other and with means for reciprocating the upsetting dies to bring them successively into contact with the end of the blank.

Referring to Fig. 1, 1 indicates the frame of the machine in horizontal guideways in which a reciprocating carrier 2 is mounted. At the front end of the carrier 2 a slide 3 is mounted in vertical guideways and to this slide a block 4 is secured in which the upsetting dies are mounted. The slide 2 is reciprocated by means of toggle levers 5 and 6 which are connected by means of a link 7 to the crank 8 of the driving shaft 9. The slide 3 is raised and lowered through mechanism (not shown) by means of a slide 10 mounted in a casing secured to the carrier 3 and reciprocated by means of a link 11 connecting the slide with the link 7. The above described construction is such that during one reciprocation of the carrier 2 the upper upsetting die is brought into contact with the end of the blank, the slide 3 being in its lowest position, and during the next reciprocation of the carrier 2 the lower upsetting die is brought into contact with the blank, the slide 3 being in its highest position, the upsetting dies being thus brought alternately into contact with the blank. The feeding rolls are indicated at 12 and 13 and are actuated from the main driving shaft 9 through mechanism (not shown). These rolls feed a wire into the machine against a stop 14.

The knife for cutting off a blank from the end of the wire is indicated at 15 and is secured to or formed integral with a slide mounted to reciprocate in a horizontal guideway formed in a block secured to the inner face of the cross-bar at the front of the machine frame. This slide is also provided with a gripper which holds the cut-off blank during the reciprocation of the slide to transfer the blank in front of the stationary die 16 secured in the cross-bar at the front of the machine frame. The slide 15 is reciprocated through suitable mechanism actuated from the driving shaft 9 by means of the connecting rod 17. The blank is held in position in front of the die 16 and is driven into the die by the action of one of the upsetting dies and is held therein during the formation of the collar and shank of the hook. After the upsetting dies have acted upon the blank the blank is discharged from the holding die 16 by means of a discharge plunger 18 secured to a cylindrical block 19 mounted to slide in a cross-bar at the front of the machine frame, the plunger being actuated at the proper time by means of the plunger 20 which is actuated through suitable mechanism from the driving shaft 9.

The construction and mode of operation of the machine so far described is the same as that of the well-known rivet machine hereinbefore referred to, such machine having been illustrated merely for the purpose of showing suitable mechanism for actuating the upsetting dies to form the collar and tubular shank of the hook, it being understood that any suitable mechanism might be provided for actuating the upsetting dies and that our invention is in no wise limited to the particular machine illustrated. The block 4 to which the upsetting dies are secured is mounted upon the slide 3 by means of a stud 21 projecting rearwardly from the block 4 into a hole in the slide 3 and is secured to the slide by means of a clamping bolt 22 passing through an open-ended curved slot in the upper end of the block, whereby the block can be adjusted upon the slide 3 by swinging it about the stud 21 as a center. A screw 23 passing through a lug on the slide 3 and bearing against the side of the upper end of the block above the screw 22 serves as a convenient means for adjusting the block.

Referring particularly to Figs. 4, 5, 6 and 7 the die for upsetting the end of the blank to partially form the shank of the hook which we have provided in the embodiment of our invention illustrated is indicated at 24. The body portion of this die is cylindrical and is received in a socket in the block 4 and is clamped therein by means of a clamping bolt 25 which extends transversely to the axis of the die and is provided with a recess to fit over the cylindrical portion of the die, this bolt being actuated to clamp the die by means of a nut 26 having a screw-threaded engagement with a projecting end of the bolt at one side of the block 4 as is clearly shown in Fig. 3. The body portion of the die 24 is bored axially and at its rear end is provided with a block 27 having a screw-threaded engagement therewith and being locked in position by means of the locking nut 28. A cylindrical block 29 is mounted to slide in the die 24 and is provided with a discharge plunger 30 projecting into the cavity of the die. The adjacent ends of the blocks 27 and 29 are reduced in size to form shoulders between which a coiled spring 30ᵃ is interposed by means of which the plunger 30 is forced outwardly as the die is withdrawn from contact with the blank to discharge the blank from the die and prevent it from being withdrawn from the holding die 16. When the setting die 24 is brought into engagement with the end of the blank as illustrated in Fig. 5 the plunger 30 is pressed backwardly, its rearward movement being limited by the contact of the block 29 with the block 27. Preferably the block 27 will be adjusted so that when the plunger is in its rearward position the end of the plunger will be slightly below the bottom of the die cavity as illustrated in Fig. 5 so that the end of the blank will be received in the depression thus formed in the bottom of the die cavity and properly centered. Also the extreme end of the blank will not be upset by the dies so that a projection will be left by means of which the blank will be properly centered in the die which completes the formation of the collar and shank.

The die which we have illustrated for completing the formation of the collar and tubular shank is indicated at 31. The body portion of this die is also cylindrical and is mounted to slide in a bushing 32 secured in a socket in the block 4 beneath the die 24. The die cavity of this die is formed in the die block 33 seated in the face of the die 31. The die cavity is shaped to form the shank of the hook and the face of the die block is below the face of the body portion 31, whereby a space is provided between the face of the die block 33 and the stationary die 16 when the body portion of the die is brought into contact with the die 16 to allow for the formation of the collar as is clearly shown in Fig. 7. Projecting through the die block 33 and into the die cavity is a plunger 34. This plunger rests upon the end of a rod 35 and passes through a block 36 secured to the end of the rod and having a sliding engagement with the body portion 31 of the die which is bored axially to receive the block. The rod 35 is mounted to slide in a bushing 37 having a screw-threaded engagement with the block 4 and provided with a reduced end which projects into the aperture in the body portion of the die. The sliding movement of the rod 35 is limited by a flange at the front end of the rod which engages the end of the bushing 37 and by an adjustable nut 38 on the rear end of the rod. The die is normally held in the position illustrated in Fig. 4 by means of a sheet metal spring 39 one end of which is secured to the block 4 by means of the screw 40, and the other end of which is slotted to extend upon each side of the body portion of the die and press against a flange at its forward end. The forward movement of the die under the force of the spring is limited by a plate 41 secured to the block 4 against which the spring rests when the die is in its forward position. The upsetting die is thus yieldingly mounted with relation to the plunger 34.

When the upsetting die is brought into contact with the blank the plunger 34 is first driven backward into the position indicated in Fig. 6 and the blank is centered in the die by the engagement of the projection at the end of the blank with the bottom of the die cavity. During the continued forward movement of the block 4 the upsetting die is held in contact with the blank by the force of the spring 39 and is driven backward into the position illustrated in Fig. 7, thereby causing the plunger to be projected into the die cavity, the tension of the spring 39 being such as to cause the metal displaced by the plunger to fill the die cavity and to flow into the space between the face of the die block 33 and the die 16. The final completion of the collar and shank is produced by a positive pressure when the upsetting die reaches the limit of its rearward movement with relation to the plunger. During the backward movement of the block 4 to separate the dies and withdraw the plunger 34 the plunger remains stationary until the bushing 37 is brought into contact with the nut 38 on the rod 35. The pressure exerted by the dies on the collar and shank of the hook and consequently the pressure of the metal upon the plunger is thus relieved and the plunger is easily withdrawn during the continued backward movement of the block 4.

Having thus indicated the nature and scope of our invention and having specifically described the preferred embodiment thereof, we claim as new and desire to secure by Letters Patent.

1. A machine for making lacing hooks which comprise a body portion and a tubular shank, having, in combination, a blank holding die to receive that portion of the blank which is to form the body portion of the hook, a die provided with a plunger arranged to receive the remaining portion of the blank projecting from the holding die, and means for relatively actuating the dies and plunger to cause the plunger to act on the remaining portion of the blank to form a tubular shank thereon while held in the dies.

2. A machine for making lacing hooks which comprise a body portion, a collar at the base of the body portion, and a tubular shank, having, in combination, a blank holding die to receive that portion of the blank which is to form the body portion of the hook, a die coöperating therewith provided with a plunger, said die being yieldingly mounted with relation to the plunger and arranged to receive the end of the blank before the blank is acted upon by the plunger, and means for actuating the dies and plunger to upset the end of the blank to form a collar and tubular shank.

3. A machine for making lacing hooks which comprise a body portion, a collar at the base of the body portion, and a tubular shank, having, in combination, a stationary blank holding die to receive that portion of the blank which is to form the body portion of the hook, a die provided with a plunger movable toward and from the stationary die and coöperating therewith to upset the remaining portion of the blank to form a collar and tubular shank, said die being yieldingly mounted with relation to the plunger to cause the plunger to act on the blank while held between the dies.

4. A machine for making hooks which comprise a body portion and a tubular shank, having, in combination, a blank holding die to receive that portion of the blank which is to form the body portion of the hook, a die coöperating therewith provided with a plunger, said die being yieldingly mounted with relation to the plunger, and means for relatively actuating the dies and plunger to cause the plunger to act on the blank to form a tubular shank thereon while held in the dies.

5. A machine for making lacing hooks which comprise a body portion and a tubular shank, having, in combination, a blank holding die to receive that portion of the blank which is to form the body portion of the hook, a die provided with a plunger arranged to receive the remaining portion of the blank projecting from the holding die, means for actuating the dies and plunger to upset the remaining portion of the blank to form a tubular shank and to withdraw the plunger after the pressure exerted by the dies on the blank is relieved.

6. A machine for making lacing hooks which comprise a body portion, a collar at the base of the body portion, and a tubular shank, having, in combination, a blank holding die to receive that portion of the blank which is to form the body portion of the hook, a die provided with a plunger arranged to receive the remaining portion of the blank projecting from the holding die and coöperate therewith to upset the remaining portion of the blank to form a collar and tubular shank and means for relatively actuating the dies and plunger to cause the plunger to displace the metal of the blank while held between the dies and thereafter to cause the dies to exert a positive pressure upon the displaced metal.

In testimony whereof we affix our signatures, in presence of two witnesses.

HARRISON H. EATON.
GEORGE GODDU.

Witnesses:
   FRED O. FISH,
   HORACE VAN EVEREN.